United States Patent

[11] 3,550,628

| [72] | Inventor | Dale J. Warner<br>Chicago, Ill. |
|---|---|---|
| [21] | Appl. No. | 840,374 |
| [22] | Filed | July 9, 1969 |
| [45] | Patented | Dec. 29, 1970 |
| [73] | Assignee | Gits Bros. Mfg. Co.<br>Chicago, Ill.<br>a corporation of Delaware |

[54] FLUID CONTROL VALVE
10 Claims, 4 Drawing Figs.

[52] U.S. Cl. .................................................. 137/625.46,
251/180
[51] Int. Cl. ............................................... F16k 5/14
[50] Field of Search ........................................ 137/625.46,
625.47; 251/176, 180, 317, 181

[56] References Cited
UNITED STATES PATENTS

| 2,145,132 | 1/1939 | Riney et al. | 137/625.47X |
| 2,977,987 | 4/1961 | Maynard | 251/317X |
| 3,098,506 | 7/1963 | Spragens | 137/625.47X |
| 3,393,844 | 7/1968 | Beres et al. | 251/317X |
| 3,437,310 | 4/1969 | Inch | 251/317 |

Primary Examiner—M. Cary Nelson
Assistant Examiner—Michael O. Sturm
Attorney—Hill, Sherman, Meroni, Gross & Simpson ABSTRACT: Efficient control of fluid is provided by an inexpensive multifunction valve having a generally cylindrical chamber with a rotatable valve means mounted therein to divide the chamber into at least two sealed spaces so that inlets and outlets are fluidly coupled in each space to allow flow of fluid therebetween. The valve means is a quadrilateral having a sealing means about its periphery. The sealing means includes a pair of L-shaped carbon elements having their free ends overlapping in sealing engagement. A retaining cover holds the sealing means adjacent a mounting body and a resilient means is interposed between the mounting body and each leg of the elements to bias the elements into engagement with a corresponding chamber surface.

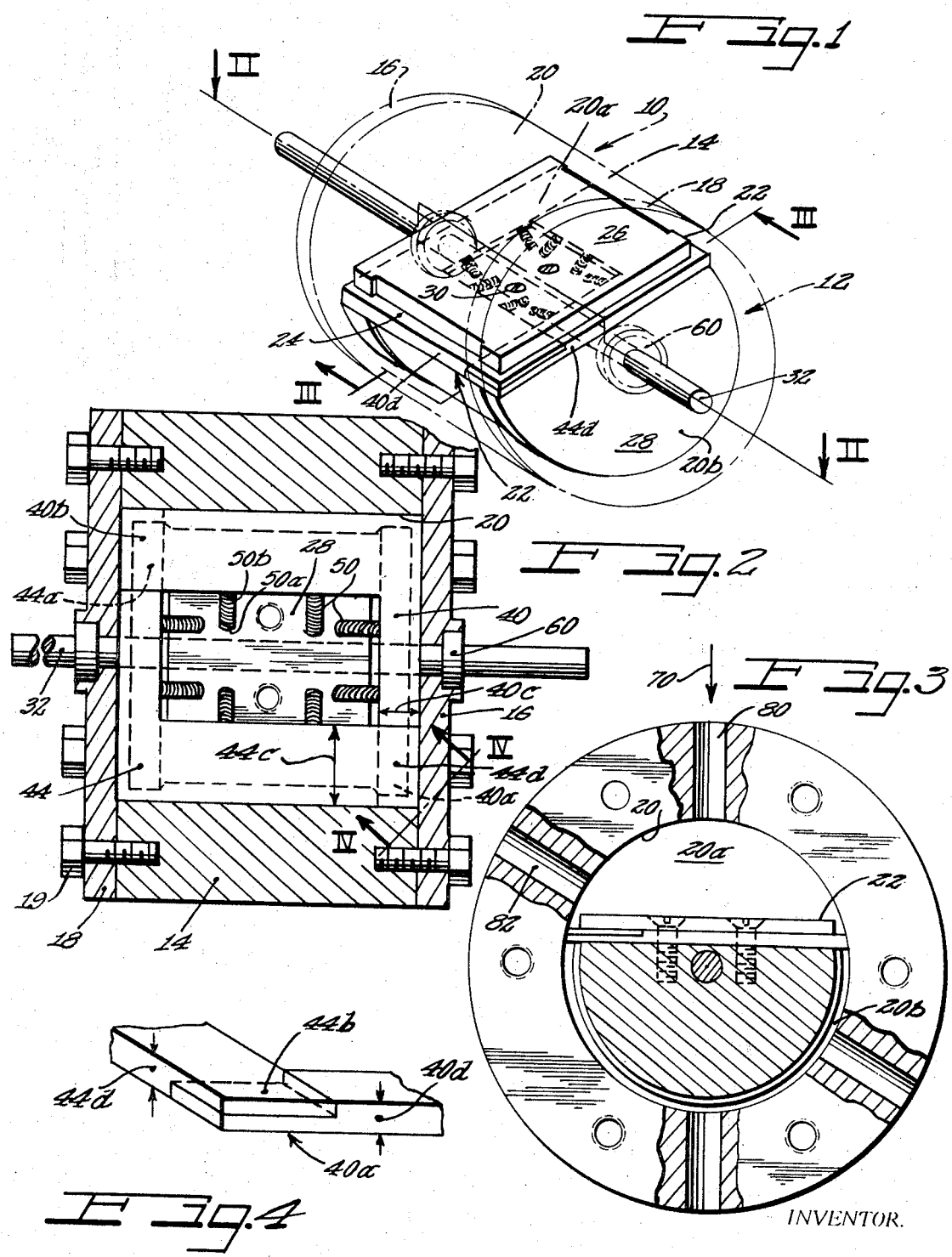

3,550,628

FLUID CONTROL VALVE

BACKGROUND OF THE INVENTION

1. Field of the Invention

This invention generally relates to a fluid control valve and more particularly encompasses a multiple function valve that changes the distribution of fluids by rotating in a generally cylindrical chamber and connecting sets of inlet and outlet ports.

2. Description of the Prior Art

Distribution control valves must be easily and rapidly changeable to meet changing conditions in fluid systems. Thus, for example, in modern aircraft or space vehicles hydraulic or pneumatic systems must perform a great many predetermined sequential operations. Also, the number as well as the size an weight of pumps and valves must be kept as small as is possible. Thus, the elimination of any valve or valves with the accompanying reduction in weight is a highly desirable result in technology where every ounce of weight is critical. Moreover, the efficiency of the valves which are necessary must be as great as possible.

Valve constructions have been considered in which the inner valve chamber is of a spherical configuration having a flap centrally rotatably mounted in said chamber for distribution of the fluid. A narrow piston ring about the circular flap seals the one portion of the sphere from the other. This construction has several disadvantages. Initially, it is difficult and expensive to machine the very small chamber exactly spherical. Also, in an extremely small chamber the placement and retention of the piston ring-type sealing means is very difficult. Thus, in a 1-inch chamber for example, the ring is very fragile. If the piston ring is to provide an efficient seal it must exactly match each and every diameter of the sphere and thus any irregularities in either the sphere or the ring will result in leakage and inefficiency of the valve. Attachment of the ring to the valve flap dictates that the sphere must be openable along its greater diameter thus limiting the method and form of its construction.

Moreover, if the ring material is to be in any way resilient the type of material of which it is made is severely limited. If the ring is not resilient then it is not as efficient as it could be. The result is that the most effective material may not be used for the piston ring-type seal necessary to the spherical chamber. A further problem develops as the ring-type seals wear and the resiliency required increases while the resiliency provided decreases. Where long operating life is a factor this wear may be critical.

SUMMARY OF THE INVENTION

To overcome the known disadvantages of the prior art I have invented a more efficient, simpler and less expensive valve construction in which the valve chamber is generally a quadrilateral of revolution and the valve means comprises a quadrilateral sealingly engaging the chamber about its periphery to divide the chamber into at least two and not necessarily equal fluidtight spaces. Inlet and outlet ports to the chamber are spaced about said chamber so that as the valve rotates the fluid is directed from an inlet to various outlet ports.

In a preferred embodiment the valve chamber is of a cylindrical tubular configuration having a pair of end plates attached over its opposite open ends. The construction of the body in this form is simplified by the fact that the various elements are very easily and inexpensively fabricated and assembled. Moreover, maintenance is improved by the fact that the valve and valve chamber are readily accessible by simply removing either of the end plates.

The valve body member has an inner surface which defines a hollow interior chamber and an outer surface which surrounds the inner surface. A generally central axis extends through the hollow interior chamber. The cross-sectional configuration of the hollow interior takes the form of a quadrilateral when the cross section is taken on a plane through a chordal line. A plurality of ports extend through the body from the inner surface to the outer surface and are spaced thereabout. These ports may be fitted with suitable pipe or tube connections of a fluid system.

Control of the fluid flow through the valve chamber from inlet ports to various of the outlet ports is accomplished by a rotatable valve means in said interior chamber. The valve means includes a valve plate mounting body which is advantageously positioned in said chamber so that the generally central axis passes therethrough whereby said mounting body may rotate about said axis. A resiliently biased sealing means is associated with the mounting body. The sealing means lies generally in a plane which includes a chord of a transverse cross section of the chamber and thus has a generally quadrilateral periphery conforming to the cross section of the hollow interior about its periphery. Resilient biasing means urge the sealing means into substantially fluid-sealing engagement with the interior surface of the hollow interior chamber to divide the chamber into at least two fluidically separated spaces.

The sealing means comprises two opposed generally L-shaped elements which correspond in length to two sides of the quadrilateral and their included angle. Each of the free ends of the L have areas of reduced thickness so that these free ends may overlap in a fluid sealing relationship at one of the corners of the quadrilateral. The resilient biasing means are interposed to act between the valve mounting body and the valve elements. At least one biasing means acts on each leg of the L to push the L into sealing engagement with its respective chamber interior surface. A valve plate secured to the valve plate mounting body overlies the seal elements to retain them in place.

The resilient biasing means for the seal elements advantageously takes the form of tension coil springs designed in accordance with the valve pressure requirements to maintain the sealing means in fluid sealing engagement over the inner chamber surface.

When the valve means rotate different sets of inlets and outlet ports are fluidly connected to perform specific functions. In this manner a single valve of the present invention may be seen to have a capacity of controlling a multitude of fluid system functions. A drive means operating in response to a suitable control means rotates the valve means and properly positions it so that it may perform its required functions.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a perspective view with parts in section of a valve according to the present invention;

FIG. 2 is a cross-sectional plan view taken along the lines II–II of FIG. 1;

FIG. 3 is an elevational cross-sectional view taken along the line III–III of FIG. 1; and FIG. 4 is an isolated view of the corner lap joint of the seal means taken along the lines IV–IV of FIG. 2.

DESCRIPTION OF THE PREFERRED EMBODIMENT

A valve structure of the present invention is generally indicated at 10 in FIG. 1. A valve body 12 includes a central, generally tubular portion 14 having its ends closed by a first end plate 16 and a second end plate 18. Suitable attachment means such as the bolts 19 may be used to connect the end plates 16, 18 to the central portion 14 with a fluidtight seal thereby forming a hollow interior chamber 20 in the body 12. The chamber 20 as illustrated takes the form of a cylinder, however, it is within the contemplation of this invention that the chamber 20 may take the form of any quadrilateral of revolution.

A valve means 22 is rotatably mounted in the chamber 20. The valve means 22 includes a sealing means 24 that is retained by a valve plate 26 which plate in turn is connected with a valve plate mounting body 28. As illustrated in FIG. 1 the sealing means 24 engage the inner surface of the hollow interior chamber 20 to create at least two fluid separated spaces such as the first space 20a above the valve means and the space 20b below the valve means. Suitable mounting means 30 may take the form of bolts that have their head above the valve plate 26 and are screwed into the valve plate mounting body 28. A valve control trunnion 32 extends from the mounting body 28 through the second end plate 18 to allow rotation and the control thereof by means outside the valve assembly.

The sealing means form an important part of the present invention. This novel sealing means may be best seen in the plan view of FIG. 2 which shows the sealing means 24 with the valve plate 26 removed from the mounting body 28. In this view it may be clearly seen that the sealing means comprises a pair of L-shaped members 40, 44, each having their sides and the included angle conforming to the sides and included angle of the quadrilateral cross section of the valve chamber 20. Each of the seal elements 40, 44 have mutually overlapping free ends of reduced thickness. Thus, a free end 40a of element 40 overlaps the free end 44b of element 44 and a free end 44a overlaps a free end 40b. The areas of reduced thickness are of a depth so that when the free ends overlap they will be substantially equal to the thicknesses 40d, 44d, of the elements 40, 44. It has been found advantageous to have the thicknesses of each of the elements equal as shown in FIG. 4, however, they may be of different thicknesses. The extent of the area of reduced thickness will generally be equal to at least the width 40c or 44c of the opposite element with allowance being made for expansion and designed movement of the sealing elements.

The sealing elements 40, 44 are biased into fluidtight engagement with the inner surface of the chamber 20 by resilient means 50 which may advantageously take the form of tension coil springs having one end 50a bearing against the mounting body 28 and an opposite end 50b coacting with the elements 40, 44 respectively Using the coil spring resilient means it has been found advantageous to provide each leg of each element with at least one resilient means 50. In this manner, the seal elements 40, 44 may easily move in response to any possible variations in the surface of the chamber 20 over which they may pass.

Suitable bearing means 60 for the trunnion 32 may be provided in one or more of the end walls 16, 18 through which the trunnion 32 may pass. From a view of fig. 2 it may be seen that the fastening means 19 which attach the ends 16, 18 to the central portion 14 are easily accessible from either side of the structure to greatly simplify maintenance and inspection.

FIG. 3 is an elevational cross-sectional view showing the valve means 22 separating the chamber 20 into at least two distinct fluid-separated spaces 20a and 20b. With the proper positioning of the ports in the valve body 12, fluid flow may be controlled through the rotation of the valve means. Thus, as illustrated, fluid under pressure represented by the arrow 70 enters the inlet 80 and flows through the upper chamber 20a and passes out through the outlet port 82. At the same time another pair of ports 84, 86 provide an inlet and outlet respectively to allow venting to the atmosphere through the chamber 20b. It is to be understood of course, that other ports may be arranged about the valve body so that upon the rotation of the valve means other inlet and outlet ports may be paired. Efficiency in operation is thus achieved through the quick and accurate control of a plurality of fluid connections. While rotational movement of the valve means has been indicated, it will be understood by those skilled in the art that the valve 22 may provide ample control through a turn of 90° or less in which case suitable stops may be provided in or out of the chamber to so limit the travel of the valve means. The number, size and configuration of the ports will depend upon the fluid to be controlled and the manner of its control. An advantage of the cylindrical chamber construction manifests itself in the fact that a port opening of accurate size and configuration may be obtained by a hole having a radial axis which radial is more easily and accurately determined in a cylinder because accuracy need only be to a line and not a single point.

Fabrication of the chamber 20 of the present invention is simple because the tubular central portion 14 may be very quickly and accurately formed out of inexpensive material by a number of different conventional material forming methods. Similarly ends 16 and 18 may easily be formed of stock material on an inexpensive quantity basis. This contrasts with the much more expensive and procedurally limited fabrication of the spherical chamber. An important maintenance advantage of the instant construction resides in the fact that not only is the valve chamber accessible from either side, but in addition the replacement of a bearing 60 may be quickly and accurately made by merely replacing an inexpensive flat sidepiece.

The construction of the valve means of the heretofore described invention provides many advantages over the prior art. Thus, the L-shaped seal elements 40, 44 are large enough in a small valve construction that they may be manipulated and used without breakage. This contrasts with fragile ring-type seals used where the chamber is spherical. The relatively large width 40c, 44c of the elements together with their spring-biased positioning assures long and reliable sealing efficiency of the valve means 22. The actual sealing material need not be resilient and thus each material is used to its best advantage. In practice, carbon has been found to provide excellent results. Moreover, the very large movement of the sealing means that is possible within the present invention will allow the rotary valve means to be used in a chamber of an ellipsoid an undulating inner surface configuration.

While the valve means 22 may be positioned on a diameter of the chamber 20 it is preferred that it be coplanar with a plane through a chord. In this manner the usual pressure space 20a of the chamber will be above the trunnion 32 and its bearing means 60 so that a pressure seal need not normally be provided for the bearing 60. Any unbalance of the valve caused by this positioning is compensated by using the valve plate mounting body 28 as a counterbalance. This addition of mass to the valve means 22 has a further advantage of increasing the ability of the valve means to move smoothly against pressure and to resist fluctuations in fluid pressure.

Although the valve means shown in configured to divide the chamber 20 into two spaces it is within the contemplation of this invention that its principles may be applied to provide divisions of the chamber into three, four or more fluid separated spaces.

Although minor modification might be suggested by those versed in the art, it should be understood that I wish to embody within the scope of the patent warranted hereon all such modifications as reasonably and properly come within the scope of my contribution to the art.

I claim:

1. A fluid distribution valve mechanism comprising a hollow body member, said body member having an inner surface defining a hollow interior chamber and an outer surface surrounding said inner surface, said hollow interior having a generally central axis therethrough, the cross-sectional configuration of said hollow interior being a quadrilateral when taken on a plane generally parallel to said axis, said body member having ports therethrough extending from said inner surface to said outer surface, a valve means rotatably mounted in said interior, said valve means including a resiliently biased sealing means associated therewith, said sealing means having a generally quadrilateral inner surface engaging periphery generally conforming to the cross section of said hollow interior and sealingly engaging the inner surface about its periphery to divide said hollow interior into at least two fluidically separated spaces, said sealing means comprising at least two elements partially overlapping each other.

2. An apparatus according to claim 1 wherein said elements of said sealing means are generally L-shaped to encompass two sides of the quadrilateral and their included angle, said free ends of said L having areas of reduced thickness so that said free ends of said respective L-shaped sealing means elements may overlap in a fluid-sealing relationship.

3. An apparatus according to claim 2 wherein said valve means includes a valve plate mounted on a valve plate-mounting body and wherein said seal elements of said sealing means are secured to said valve plate body by an overlying retaining cover, said retaining cover being detachably mounted on said valve plate-mounting body.

4. An apparatus according to claim 3 wherein said resilient biasing means extend from said mounting body against said elements of said seal means to force said seal elements into engagement with said interior surface of said hollow interior chamber.

5. An apparatus according to claim 4 wherein said resilient means include tension coil springs, at least one of said resilient means acting between said mounting body and each leg of said seal elements.

6. An apparatus according to claim 5 wherein said hollow interior is in the form of a cylinder and wherein said axis passes through the centroid of said cylinder, said mounting body rotating about said axis, said valve plate and seal means lying on a chord of a transverse cross section of said cylinder, and said sealing means having a rectangular peripheral configuration.

7. An apparatus according to claim 6 wherein said ports include a pressure inlet, a pressure outlet, a vent inlet and a vent outlet, said ports being spaced about said body member so that said valve means couples said pressure ports together and said vent ports together respectively.

8. An apparatus according to claim 7 in which said body comprises a cylindrical central portion having end plates attached thereover at each end, at least one of said end plates having bearing means and a valve-operating trunnion extending through at least one of said plates and through said bearings.

9. An apparatus according to claim 2 wherein said seal elements are made entirely of carbon and are of substantial width.

10. A multifunction fluid control valve comprising a generally cylindrical chamber, inlet and outlet ports spaced about and communicating with said chamber, a rotatable valve means mounted therein to divide the chamber into at least two sealed spaces so that said inlets and outlets are fluidly coupled in each space to allow flow of fluid therebetween, said valve means including a quadrilateral configured sealing means, said sealing means including a pair of L-shaped carbon elements having their free ends overlapping in sealing engagement and their side edges sealingly engaging the chamber to form said fluid sealed spaces, said valve means further including a mounting body rotatably positioned in said chamber, and at least one resilient means interposed between said mounting body and each leg of each of said L-shaped elements whereby said elements are biased into engagement with a corresponding chamber surface.